US012494331B2

(12) United States Patent
Nakase et al.

(10) Patent No.: US 12,494,331 B2
(45) Date of Patent: Dec. 9, 2025

(54) MULTI-DIRECTIONAL INPUT DEVICE

(71) Applicant: SHENZHEN ZESUM TECHNOLOGY CO., LTD., Shenzhen (CN)

(72) Inventors: Yusho Nakase, Shenzhen (CN); Shiying Yang, Shenzhen (CN); Chaoxian Chen, Shenzhen (CN)

(73) Assignee: SHENZHEN ZESUM TECHNOLOGY CO., LTD., Shenzhen (CN)

( * ) Notice: Subject to any disclaimer, the term of this patent is extended or adjusted under 35 U.S.C. 154(b) by 347 days.

(21) Appl. No.: 18/188,649

(22) Filed: Mar. 23, 2023

(65) Prior Publication Data

US 2024/0222049 A1 Jul. 4, 2024

(30) Foreign Application Priority Data

Dec. 30, 2022 (CN) ......................... 202223601583.2

(51) Int. Cl.
*H01H 25/04* (2006.01)
*H01H 25/06* (2006.01)

(52) U.S. Cl.
CPC ............ *H01H 25/04* (2013.01); *H01H 25/06* (2013.01); *H01H 2025/043* (2013.01)

(58) Field of Classification Search
CPC ...... H01H 25/04; H01H 25/008; H01H 23/14; H01H 5/008; G05G 9/00; G05G 3/0338; G06F 3/0338
See application file for complete search history.

(56) References Cited

U.S. PATENT DOCUMENTS 6,654,005 B2 * 11/2003 Wang ................. G05G 9/04796 345/161
10,770,247 B1 * 9/2020 Wu ........................ H01H 23/04
2021/0093950 A1 * 4/2021 Duncan ................. G06F 3/0202

* cited by examiner

*Primary Examiner* — Renee S Luebke
(74) *Attorney, Agent, or Firm* — Westbridge IP LLC

(57) ABSTRACT

Disclosed is a multi-directional input device, including: a first casing provided with a first containing space with a first opening; an operating body, wherein one end of the operating body is provided with a tiltable operating portion penetrating through the first opening, and another end of the operating body extends into the first containing space and is provided with a clamping joint; a hemisphere provided with an installation hole for inserting the clamping joint; a positioning piece provided on an inner wall of the installation hole, wherein the positioning piece is elastically abutted against the clamping joint so that the clamping joint is fixed in the installation hole; a reset mechanism for returning the operating body to a neutral position; a switch mechanism for pressing and operating the switch mechanism through the operating body to realize electrical action.

4 Claims, 13 Drawing Sheets

MULTI-DIRECTIONAL INPUT DEVICE

CROSS-REFERENCE TO RELATED APPLICATIONS

This application claims priority to Chinese Patent Application No. 202223601583.2, filed on Dec. 30, 2022, the entire disclosure of which is incorporated herein by reference.

TECHNICAL FIELD

The present disclosure relates to the technical field of input devices, and in particular to a multi-directional input device.

BACKGROUND

A multi-directional input device generally includes a casing, an operating body rotatably provided on the casing, two rocker arms that rotate following the tilting action of the operating body, and a detection device that detects the rotation amount of the rocker arms and outputs a corresponding signal. In order to make the process of controlling the tilting of the operating body smoother, the bottom of the operating body is generally provided with spherical components, and the part of the operating body outside the casing is generally provided with a larger grip portion, which is convenient for manual manipulation of the operating body through the grip portion, thus the shape of the operating body generally presents a special-shaped body with large ends and a small middle. The multi-directional input device separates the operating body and spherical components, so that the operating body can be assembled into the opening of the casing.

However, the existing multi-directional input device has the problem that the operating body is easy to fall off.

SUMMARY

The main objective of the present disclosure is to provide a multi-directional input device, aiming at making the operating body not easy to fall off.

In order to achieve the above objective, the present disclosure provides a multi-directional input device, including: a casing, an operating body, a hemisphere, a positioning piece, a reset mechanism, a switch mechanism, a first rocker arm, a second rocker arm, a first detection mechanism and a second detection mechanism.

The first casing is provided with a first containing space with a first opening.

One end of the operating body has a tiltable operating portion penetrating through the first opening, and another end of the operating body extends into the first containing space and is provided with a clamping joint.

The hemisphere is provided with an installation hole for inserting the clamping joint.

The positioning piece is provided on an inner wall of the installation hole, the positioning piece is elastically abutted against the clamping joint so that the clamping joint is fixed in the installation hole.

The reset mechanism is for returning the operating body to a neutral position.

The switch mechanism is for pressing and operating the switch mechanism through the operating body to realize electrical action.

The first rocker arm and the second rocker arm are provided outside the first casing, the first rocker arm and the second rocker arm rotate following a tilting operation of the operation body, and the rotation axes of the first rocker arm and the second rocker arm are horizontal and perpendicular to each other.

The first detection mechanism is for detecting the rotation movement of the first rocker arm and a second detection mechanism is for detecting the rotation movement of the second rocker arm.

In an embodiment, the multi-directional input device includes a plurality of positioning pieces provided on an inner periphery of the installation hole.

In an embodiment, the positioning piece is an elastic arm, a first end of the elastic arm is integrally formed with the inner wall of the installation hole, and a second end of the elastic arm extends along an insertion direction of the clamping joint and form a gap with the inner wall of the installation hole, when the clamping joint is inserted into the installation hole, the clamping joint is abutted against the elastic arm to make the elastic arm deform in a direction to reduce the gap.

In an embodiment, the clamping joint is provided with a positioning notch corresponding to the elastic arm, and the elastic arm is inserted into the positioning notch to fix the operating body and the hemisphere; and/or the operating body is provided with a limiting portion towards an insertion direction, and when the clamping joint is inserted into the installation hole, the limiting portion is abutted against and cooperated with an upper surface of the hemisphere to limit the operating body from continuing to be inserted into the installation hole.

In an embodiment, the switch mechanism includes a switch, a circuit substrate, and a pressing bracket.

The switch is made of metal, and the switch has a disc-shaped reversing mechanism.

The circuit substrate is electrically connected to the switch.

The pressing bracket is for pressing the switch, the pressing bracket is coaxial with the operating body, the pressing bracket is roughly cylindrical, and an upper end of the pressing bracket is formed with a hemispherical concave corresponding to the hemisphere portion on the clamping joint provided on the operating body, and the lower end of the pressing bracket is formed with a convex portion for pressing the switch.

In an embodiment, the hemisphere is provided with a circular plane portion, and the reset mechanism includes a spring bracket, a platen and a coil spring.

The spring bracket is fixed inside the first containing space, the spring bracket being sleeved on an outer periphery of the pressing bracket at intervals.

The platen is provided between the hemisphere and the spring bracket.

An end of the coil spring is abutted against the spring bracket, and another end of the coil spring is abutted against the platen, so that the platen is abutted against the circular planar portion.

In an embodiment, the multi-directional input device further includes a second casing provided on an upper portion of the first casing.

The second casing forms a second containing space, both the first rocker arm and the second rocker arm are movably accommodated in the second containing space, the second casing is provided with a second opening for the operating body to pass through, and the second opening is provided at a center of a top surface of the second containing space.

The multi-directional input device of the present disclosure includes a first casing, an operating body and a hemisphere, the first casing is provided with a first containing space with a first opening, and the operating body is movably provided through the first opening, one end of the operating body located in the first containing space is provided with a clamping joint, the hemisphere is provided with an installation hole corresponding to the clamping joint, and the clamping joint is inserted into the installation hole to fix the operating body and the hemisphere. The inner wall of the installation hole is further provided with a positioning piece, when the clamping joint is inserted into the installation hole, the positioning piece is elastically abutted against a side wall of the clamping joint, the clamping joint is a rigid body, so that an clastic-deformation is occurred on the positioning piece in a direction away from the clamping joint, the positioning piece tends to restore the deformation and generate a reaction force on the side wall of the clamping joint, so that the clamping joint can be firmly fixed inside the installation hole, reducing the probability that the operating body will fall off from the hemisphere.

BRIEF DESCRIPTION OF THE DRAWINGS

In order to more clearly illustrate the technical solutions in the embodiments of the present disclosure or in the related art, drawings used in the embodiments or in the related art will be briefly described below. Obviously, the drawings in the following description are only some embodiments of the present disclosure. It will be apparent to those skilled in the art that other figures can be obtained according to the structures shown in the drawings without creative work.

Figure 1:
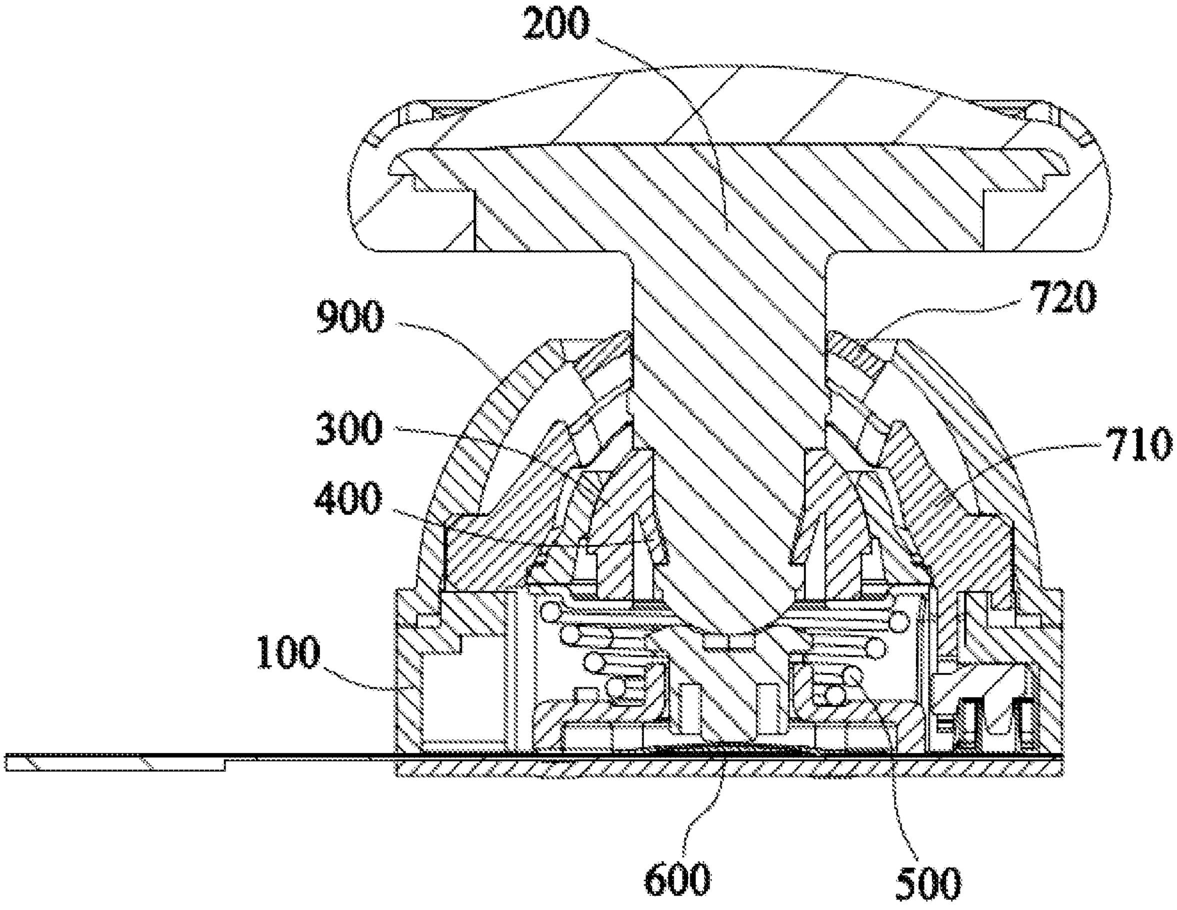
FIG. 1 is a schematic cross-sectional view of a multi-directional input device according to an embodiment of the present disclosure.

The realization of the objective, functional characteristics, and advantages of the present disclosure are further described with reference to the accompanying drawings.

DETAILED DESCRIPTION OF THE EMBODIMENTS

The technical solutions in the embodiments of the present disclosure will be clearly and completely described below with reference to the drawings in the embodiment of the present disclosure. Obviously, the described embodiments are only a part of the embodiments of the present disclosure, not all of the embodiments. Based on the embodiments in the present disclosure, all other embodiments perceived by those ordinary skills in the art without creative effort should be fallen within the protection scope of the present disclosure.

It should be noted that all of the directional instructions in the embodiments of the present disclosure (such as, up, down, left, right, front, rear . . . ) are only used to explain the relative position relationship and movement of each component under a specific attitude (as shown in the drawings), if the specific attitude changes, the directional instructions will change correspondingly.

In the present disclosure, unless otherwise specified and limited, the terms "connection" and "fixation" should be understood in a broad sense, for example, "fixation" can be a fixed connection, a detachable connection, or an integration; it may be a mechanical connection or an electrical connection; it may be a direct connection or an indirect connection through an intermediary, and it may be an internal communication between two elements or an interaction relationship between two elements, unless otherwise clearly defined. Those of ordinary skill in the art can understand the specific meanings of the above terms in the present disclosure according to specific situations.

Besides, the descriptions in the present disclosure that refer to "first," "second," etc. are only for descriptive purposes and are not to be interpreted as indicating or implying relative importance or to implicitly indicate the number of technical features indicated. Thus, a feature defined as "first" or "second" may explicitly or implicitly include at least one of the feature. In addition, technical solutions among the embodiments can be combined with each other, but must be based on the realization of the technical solutions by those skilled in the art, and when the technical solutions are contradictory to each other or cannot be realized, the technical solutions should be considered that the combination does not exist, and the technical solutions are not fallen within the protection scope claimed in the present disclosure.

A multi-directional input device generally includes a casing, an operating body rotatably provided on the casing, two rocker arms that rotate following the tilting action of the operating body, and a detection device that detects the rotation amount of the rocker arms and outputs a corresponding signal. The bottom of the operating body is generally equipped with a spherical component, and when the operating body is tilted, the spherical component is used as a fulcrum for the operating body to rotate, so that the tilting action of the operating body is smoother. Since a part of the operating body outside the casing is generally provided with a large grip portion, it is convenient for manual manipulation of the operating body through the grip portion, so that the shape of the operating body generally presents as a special-shaped body with large ends and a small middle, and it is difficult to directly assemble with the casing. In order to facilitate the assembly of the operating body and the casing, some existing multi-directional input devices adopt a method of providing a larger opening on the casing, but providing a larger opening on the casing will make it easy to accumulate dust inside the casing. Other multi-directional input devices adopt the method of providing the grip portion and the operating body separately, and forming the operating body and the spherical components integrally. In this way, the grip portion is easy to fall off due to the large range movement of manual manipulation of the grip portion, there are also some multi-directional input devices that use the method of integrally forming the grip portion and the operating body, and separately forming the operating body and the spherical components. Thus the operating body of the input device is easy to fall off, and it is difficult to reinstall the operating body after falling off, so that the multi-directional input device cannot continue to be used.

Figure 2:
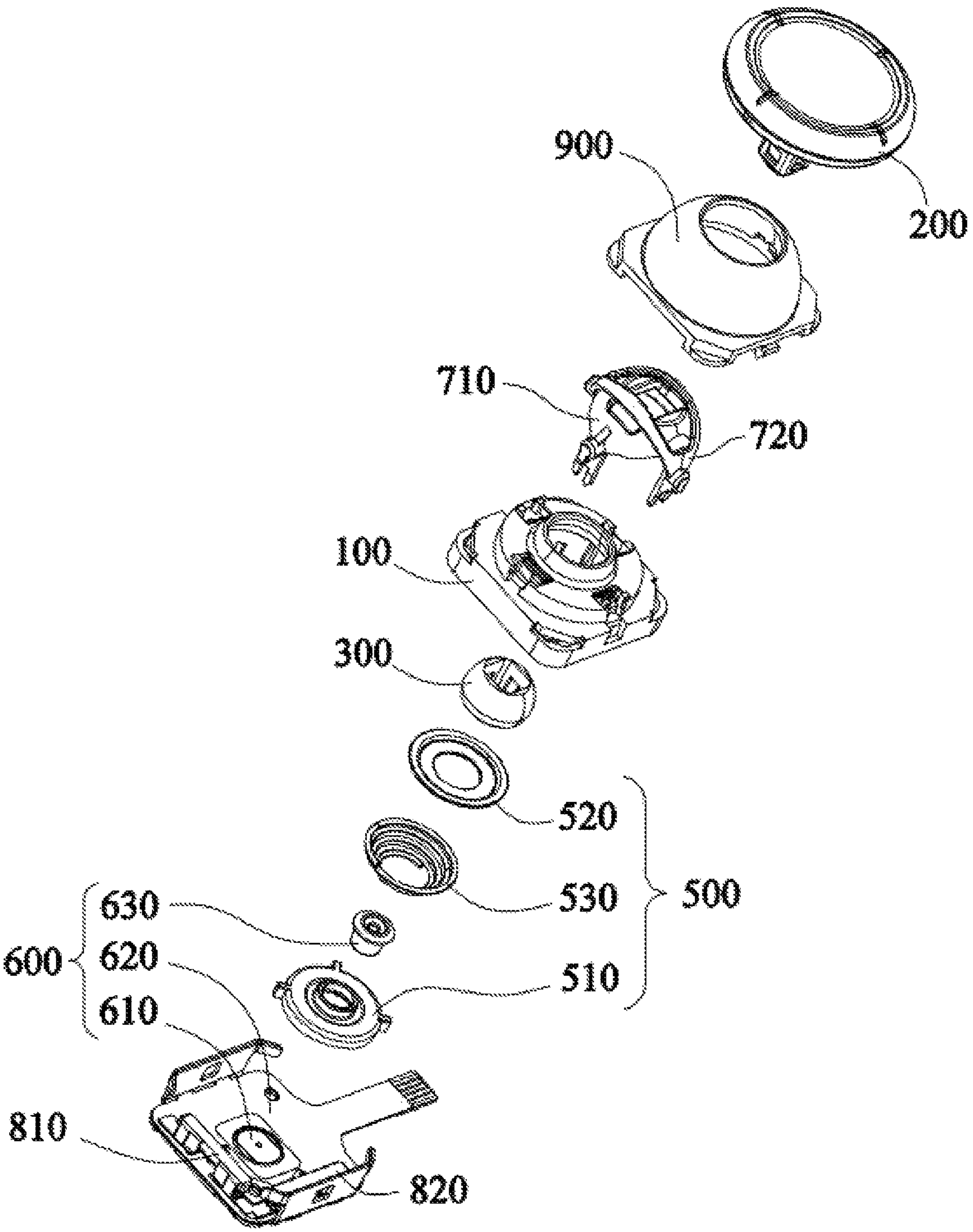
FIG. 2 is a schematic exploded view of the multi-directional input device according to an embodiment of the present disclosure.
Figure 3:
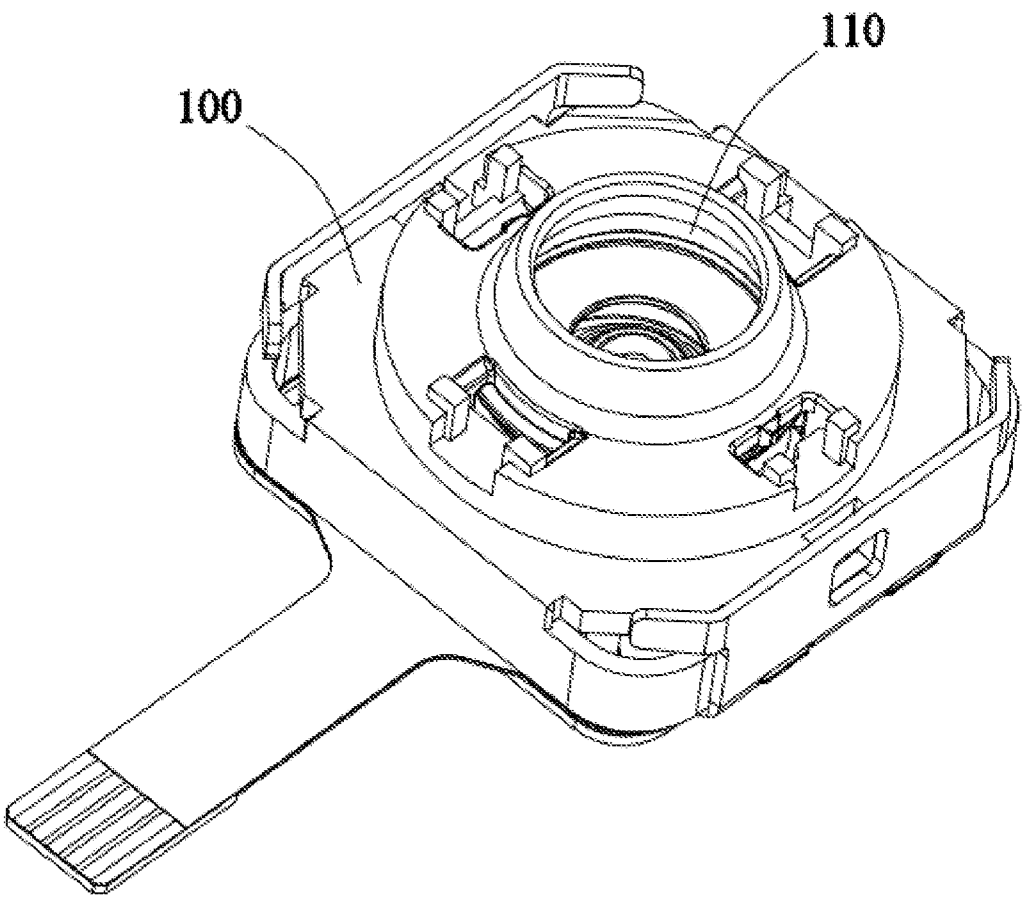
FIG. 3 is a first schematic partial structural view of the multi-directional input device of the present disclosure.
Figure 4:
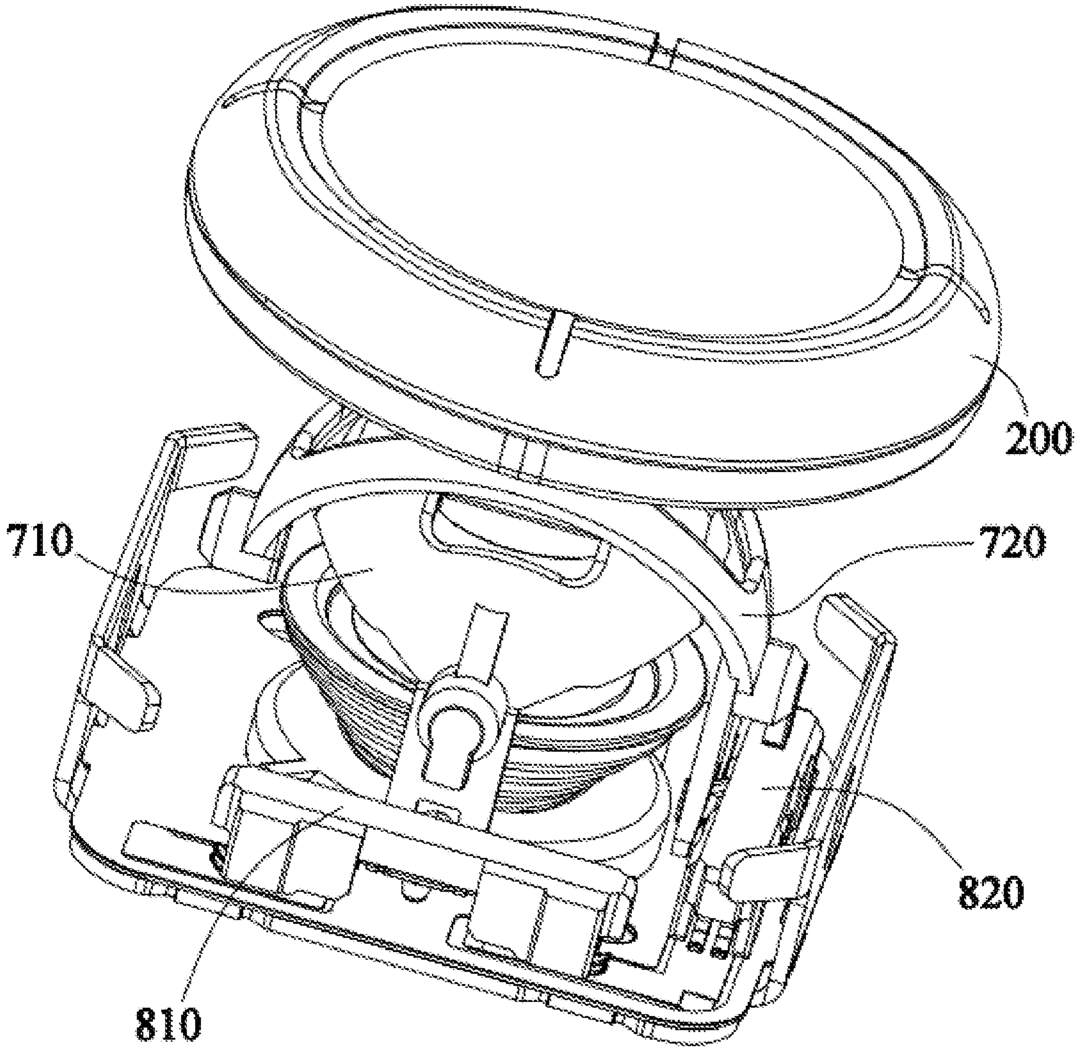
FIG. 4 is a second schematic partial structural view of the multi-directional input device of the present disclosure.

As shown in FIG. 1 to FIG. 2, FIG. 1 is a schematic cross-sectional view of a multi-directional input device according to an embodiment of the present disclosure; FIG. 2 is a schematic exploded view of the multi-directional input device according to an embodiment of the present disclosure.

In the embodiments of the present disclosure, the multi-directional input device includes a first casing 100, an operating body 200, a hemisphere 300, a positioning piece 400, a reset mechanism 500, a switch mechanism 600, a first rocker arm 710, a second rocker arm 720, a first detection mechanism 810 and a second detection mechanism 820.

The first casing 100 is provided with a first containing space 110 with a first opening.

One end of the operating body 200 has a tiltable operating portion 230 penetrating through the first opening, and another end of the operating body 200 extends into the first containing space 110 and is provided with a clamping joint 210.

The hemisphere 300 is provided with an installation hole 310 for inserting the clamping joint 210.

The positioning piece 400 is provided on an inner wall of the installation hole 310, the positioning piece 400 is elastically abutted against the clamping joint 210 so that the clamping joint 210 is fixed in the installation hole 310.

The reset mechanism 500 is for returning the operating body 200 to a neutral position.

The switch mechanism 600 is for pressing and operating the switch mechanism 600 through the operating body 200 to realize electrical action;

The first rocker arm 710 and the second rocker arm 720 are provided outside the first casing 100, the first rocker arm 710 and the second rocker arm 720 rotate following a tilting operation of the operation body 200, and the rotation axes of the first rocker arm 710 and the second rocker arm 720 are horizontal and perpendicular to each other.

The first detection mechanism 810 is for detecting the rotation movement of the first rocker arm 710 and a second detection mechanism 820 is for detecting the rotation movement of the second rocker arm 720.

The multi-directional input device of the present disclosure includes the first casing 100, the operating body 200 and the hemisphere 300, the first casing 100 is provided with a first containing space 110 with a first opening, and the operating body 200 is movably provided through the first opening, one end of the operating body 200 located in the first containing space 110 is provided with a clamping joint 210, and the hemisphere 300 is provided with an installation hole 310 corresponding to the clamping joint 210, and the clamping joint 210 is inserted into the installation hole 310 to fix the operating body 200 and the hemisphere 300. The inner wall of the installation hole 310 is further provided with a positioning piece 400, when the clamping joint 210 is inserted into the installation hole 310, the positioning piece 400 is elastically abutted against the side wall of the clamping joint 210, the clamping joint 210 is a rigid body, so that the elastic-deformation is occurred on the positioning piece 400 in the direction away from the clamping joint 210, the positioning piece 400 tends to restore the deformation and generate a reaction force on the side wall of the clamp clamping joint 210, so that the clamp clamping joint 210 can be firmly fixed inside the installation hole 310, reducing the probability that the operating body 200 will fall off from the hemisphere 300.

In this embodiment, the positioning piece 400 and the hemisphere 300 can be integrally formed, or can be designed separately, and the positioning piece 400 is elastically abutted against the clamping joint 210. The positioning piece 400 has elasticity, for example, the positioning piece 400 is a protrusion made of elastic materials, etc., the positioning piece 400 may also be made of non-elastic materials, but the structure of the positioning piece 400 is clastic. The installation hole 310 may or may not pass through the hemisphere 300. As shown in FIG. 1 to FIG. 4, in this embodiment, the multi-directional input device further includes a first rocker arm 710 and a second rocker arm 720, and the first rocker arm 710 and the second rocker arm 720 rotate following the tilting operation of the operating body 200, when the first rocker arm 710 and the second rocker arm 720 rotate, a corresponding slider is moved to slide on the circuit substrate 620, so that the electrical connection position of the contact on the slider and the circuit substrate 620 changes, so that a control unit of the multi-directional input device receives the position changes of the first rocker arm 710 and the second rocker arm 720, that is, receives the specific position of the tilting state of the operating body 200. In this embodiment, a clamping groove is provided under a rotating shaft of the first rocker arm 710, and the first rocker arm 710 clamps the first clamping portion provided by the first detection mechanism 810 through the clamping groove. When the first rocker arm 710 rotates under the tilting action of the operating body 200, the first rocker arm 710 drives the first detection mechanism 810 to slide on the circuit substrate 620, thereby changing the position of the electrical connection contact between the first detection mechanism 810 and the circuit substrate 620, which allows the circuit substrate 620 to detect the rotation amount of the first rocker arm 710, thereby obtaining the rotation amount of the operating body 200 in one direction. A clamping groove is provided below the rotating shaft of the second rocker arm 720, and the second rocker arm 720 clamps the first clamping portion provided by the second detection mechanism 820 through the clamping groove. When the second rocker arm 720 rotates under the tilting action of the operating body 200, the second rocker 720 drives the second detection mechanism 820 to slide on the circuit substrate 620, thereby changing the position of the electrical connection contact between the second detection mechanism 820 and the circuit substrate 620, which allows the circuit substrate 620 to detect the rotation amount of the second swing arm 720, thereby obtaining the rotation amount of the operating body 200 in another direction. The circuit substrate 620 can combine the rotation amounts of the operating body 200 in two directions to obtain the rotation direction and rotation amount of the operating body 200.

Further, there are a plurality of positioning pieces 400, and the plurality of positioning pieces 400 are provided on the inner periphery of the installation hole 310.

Figure 5:
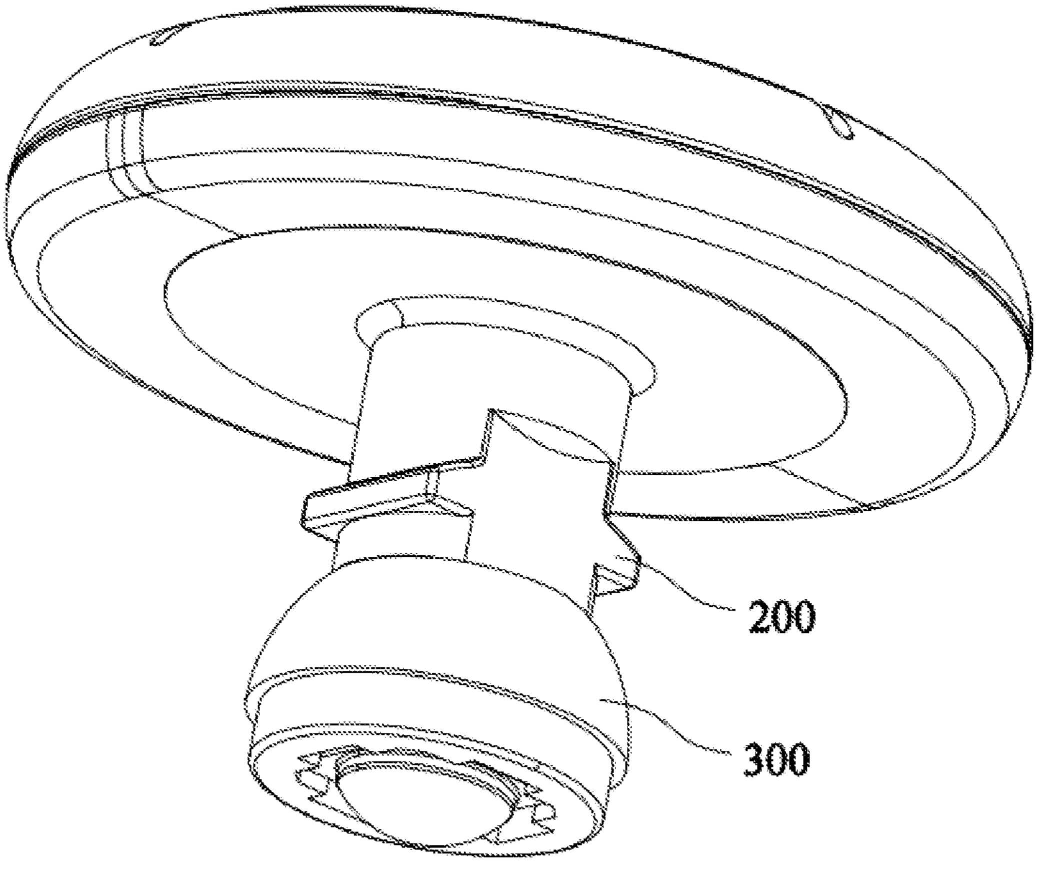
FIG. 5 is a schematic structural view of an operating body and a hemisphere of the multi-directional input device of the present disclosure.
Figure 6:
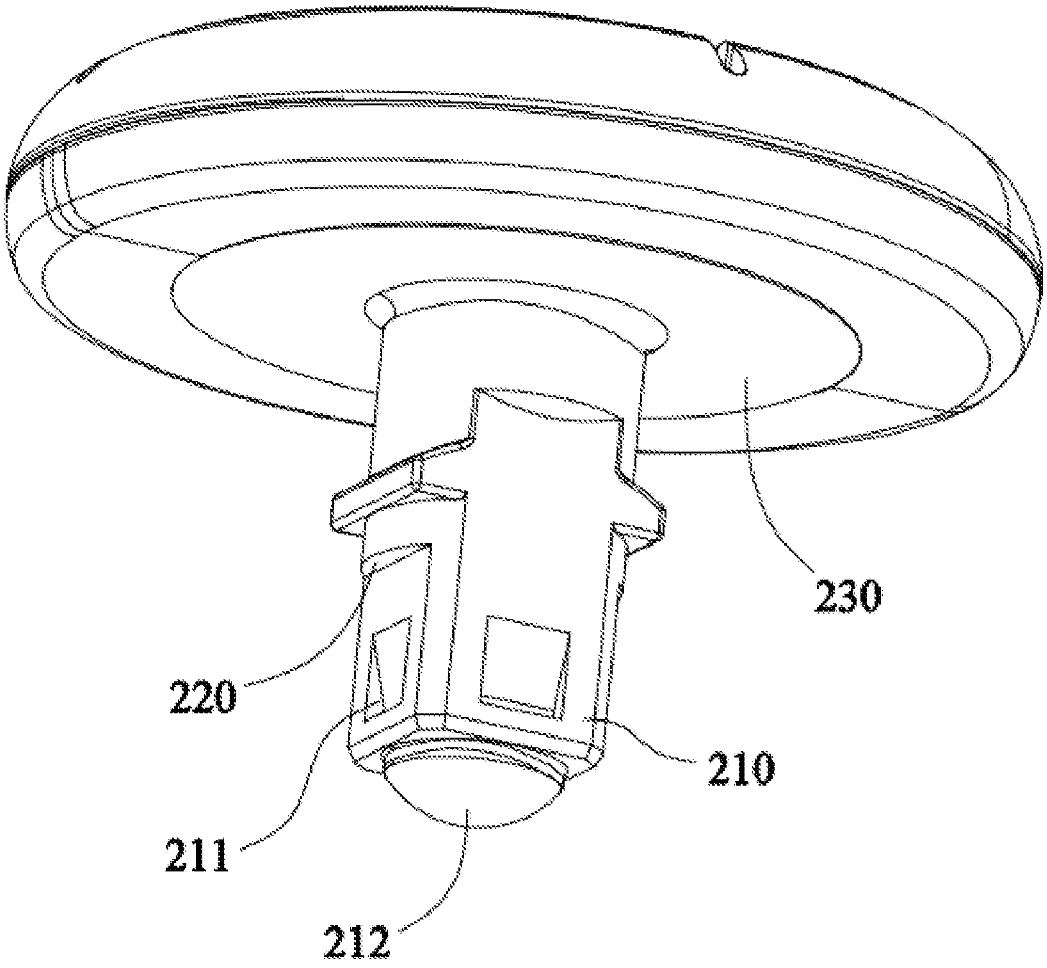
FIG. 6 is a schematic structural view of the operating body of the multi-directional input device of the present disclosure.
Figure 7:
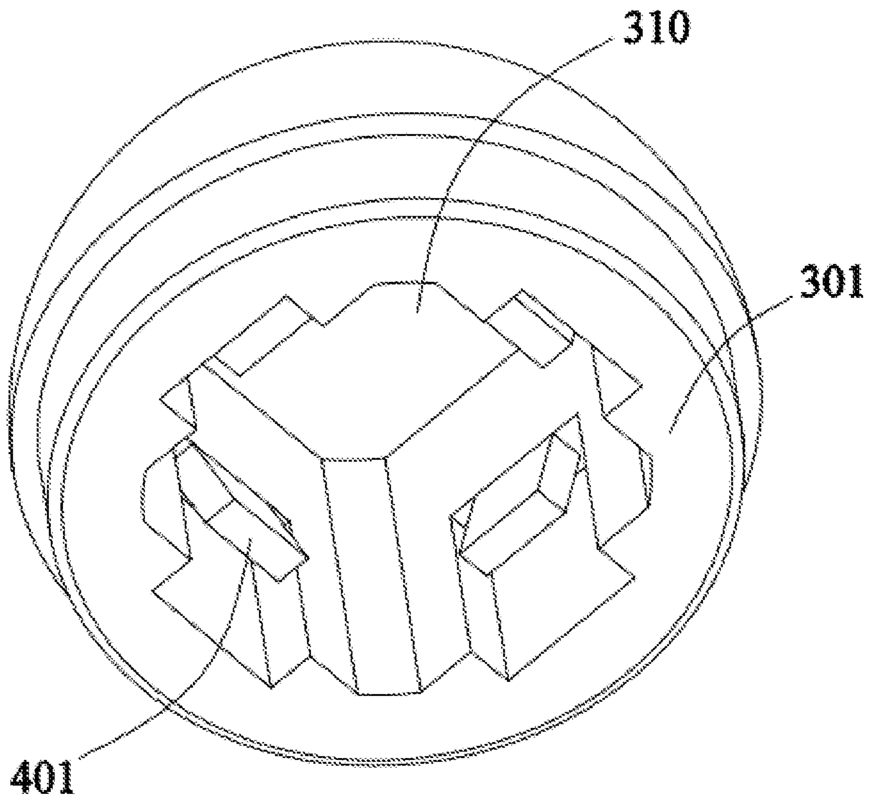
FIG. 7 is a schematic structural view of the hemisphere of the multi-directional input device of the present disclosure.
Figure 8:
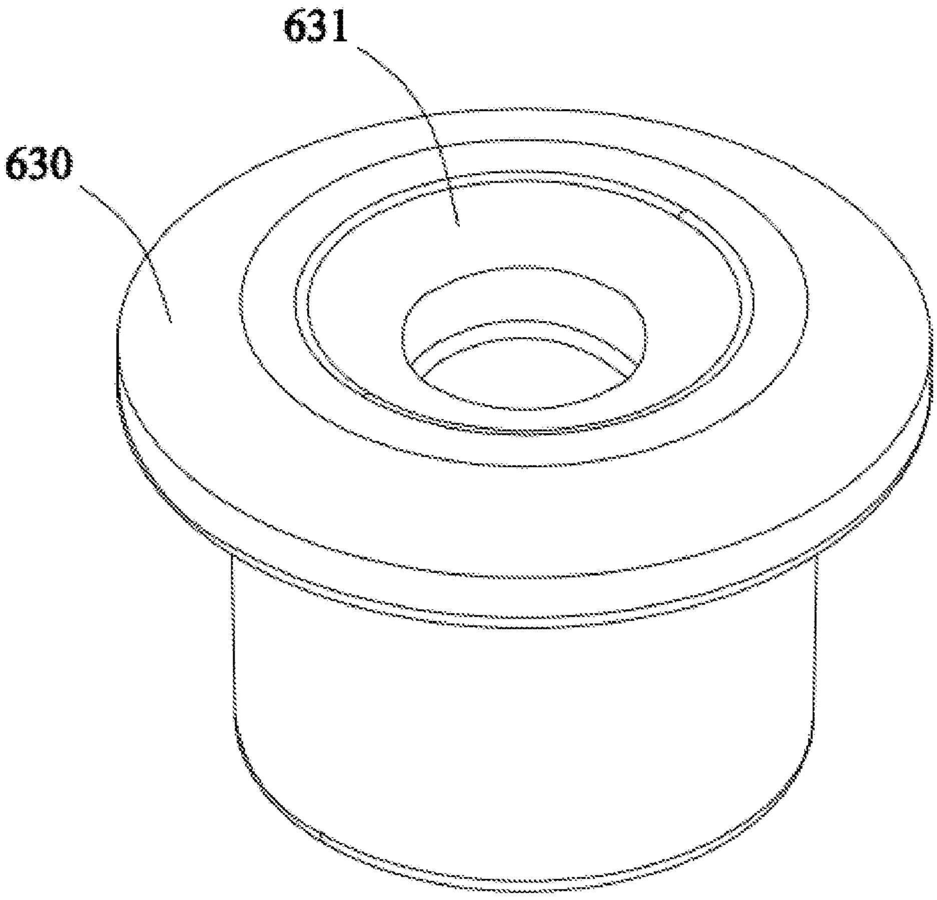
FIG. 8 is a first schematic structural view of a pressing bracket of the multi-directional input device of the present disclosure.
Figure 9:
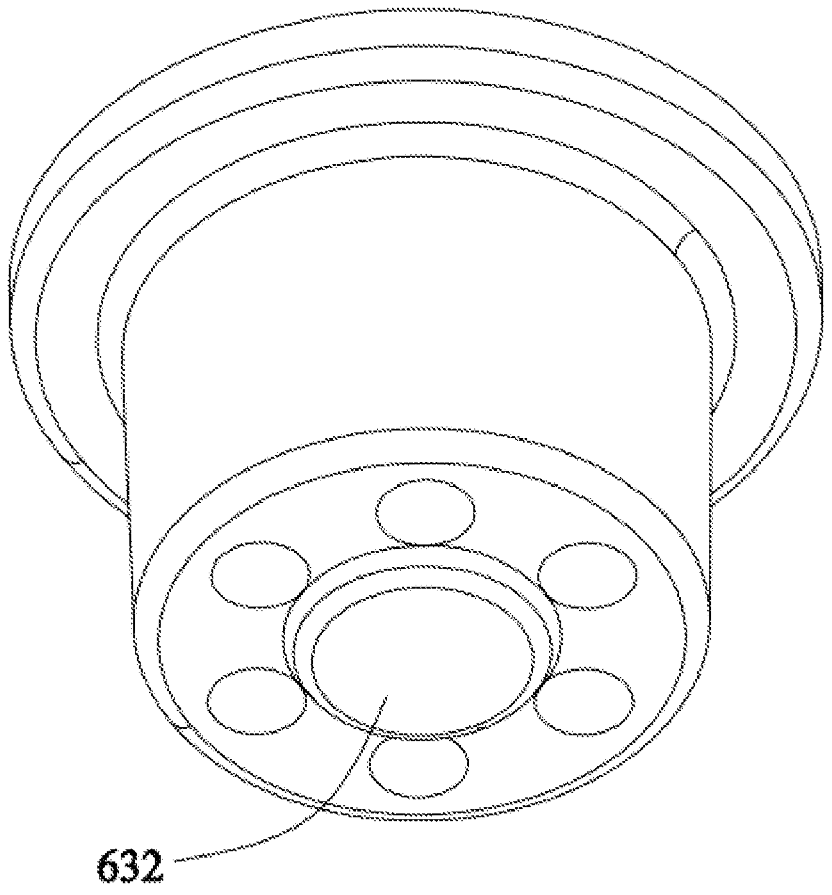
FIG. 9 is a second schematic structural view of the pressing bracket of the multi-directional input device of the present disclosure.
Figure 10:
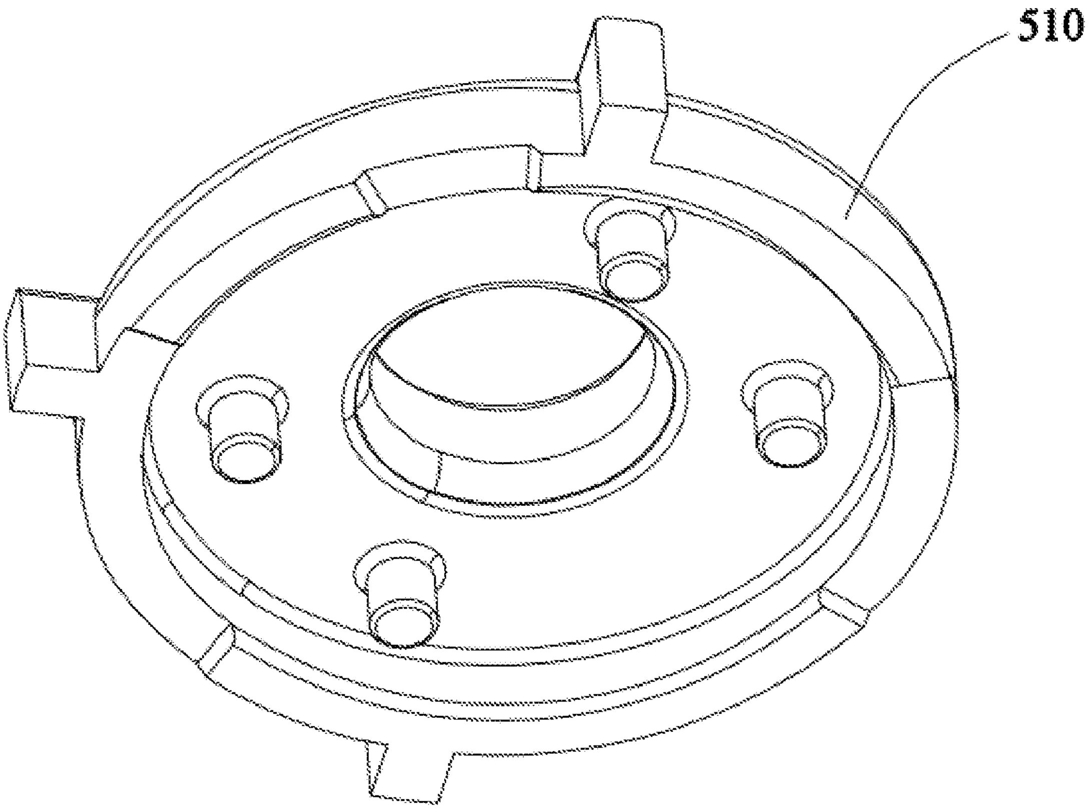
FIG. 10 is a schematic structural view of a spring bracket of the multi-directional input device of the present disclosure.
Figure 11:
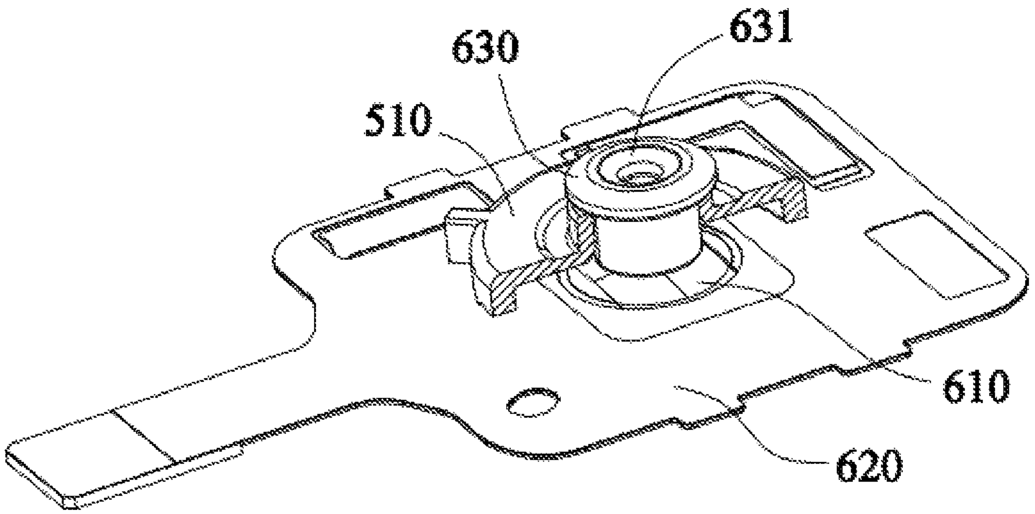
FIG. 11 is a third schematic partial structural view of the multi-directional input device of the present disclosure.

As shown in FIG. 5 to FIG. 7, in this embodiment, there are a plurality of positioning pieces 400, and the plurality of positioning pieces 400 are provided on the outer periphery of the clamping joint 210, so that the clamping joint 210 can be fixed more firmly in the installation hole 310, thereby the operating body 200 is less likely to fall off. Specifically in this embodiment, the inner wall of the installation hole 310 is provided with four positioning pieces 400, and the two positioning pieces 400 form a group, the two positioning pieces 400 in the group are oppositely provided to clamp the clamping joint 210 in the installation hole 310.

Further, the positioning piece 400 is an elastic arm 401, the first end of the elastic arm 401 is integrally formed with the inner wall of the installation hole 310, and the second end of the clastic arm 401 extends along an insertion direction of the clamping joint 210, and form a gap with the inner wall of the installation hole 310, the clamping joint 210 is inserted into the installation hole 310, the clamping joint 210 is abutted against the elastic arm 401 to make the clastic arm 401 deformed in a direction to reduce the gap.

As shown in FIG. 5 to FIG. 7, in this embodiment, the positioning piece 400 is an clastic arm 401, the first end of the clastic arm 401 is fixed, the second end is a free end, and the second end extends obliquely toward the inside of the installation hole 310 and forms a space with the inner wall of the installation hole 310, so that the clastic arm 401 forms the clastic structure. When the clamping joint 210 is inserted into the installation hole 310, the end of the clamping joint 210 is first abutted against the first end of the clastic arm 401, and as the clamping joint 210 continues to be inserted, the abutting portion of the end of the clamping joint 210 and the clastic arm 401 slides toward the second end of the clamping joint 210, so that the second end of the clastic arm 401 deforms in a direction away from the clamping joint 210. Since the clastic arm 401 tends to restore its own deformation, the clastic arm 401 has an effect force on the clamping joint 210, so as to fix the clamping joint 210 inside the installation hole 310. The specific shape of the elastic arm 401 can be adjusted and designed according to needs, as long as it meets the functional requirements, it is not limited here.

Further, the clamping joint 210 is provided with a positioning notch 211 corresponding to the elastic arm 401, and the clastic arm 401 is inserted into the positioning notch 211 to fix the operating body 200 and the hemisphere 300.

The operating body 200 is provided with a limiting portion 220 towards the insertion direction, and when the clamping joint 210 is inserted into the installation hole 310, the limiting portion 220 is abutted against and cooperated with the upper surface of the hemisphere 300 to limit the operation body 200 from continuing to be inserted into the installation hole 310.

As shown in FIG. 5 to FIG. 7, in this embodiment, the clamping joint 210 is provided with a positioning notch 211 corresponding to the positioning piece 400, the shape of the positioning notch 211 corresponds to the shape of the positioning piece 400, and each positioning piece 400 is correspondingly provided with a positioning notch 211, when the clamping joint 210 is inserted into the installation hole 310 to reach the desired position, the positioning piece 400 can be embedded in the positioning notch 211, so that the positioning piece 400 forms an interference fit with the clamping joint 210, thereby preventing the clamping joint 210 from being pulled out from the installation hole 310, which improves the firmness of the clamping joint 210 in the installation hole 310. Specifically in this embodiment, the shape of the positioning notch 211 corresponds to the shape of the elastic arm 401. The bottom of the positioning notch 211 is inclined, and a depth of a side that matches the second end of the elastic arm 401 is greater than that of a side that matches the first end of the elastic arm 401. The operating body 200 cannot fall off from the hemisphere 300 unless the four elastic arms 401 provided on the outer periphery of the clamping joint 210 in this embodiment are damaged.

As shown in FIG. 5 to FIG. 7, in this embodiment, the operating body 200 is provided with a limiting portion 220, which can be a separately provided protrusion, or can be formed by changing the cross-sectional diameter or cross-sectional shape of the operating body 200. In this embodiment, the installation hole 310 penetrates through the hemisphere 300, so after the clamping joint 210 is inserted into the installation hole 310, the positioning piece 400 cooperates with the positioning notch 211, thus the movement of the clamping joint 210 in the direction of pulling out from the installation hole 310 is limited, but the clamping joint 210 continues to extend into the installation hole 310 without restriction, if force is continuously applied to the operating body 200, more portions of the operating body 200 may extend into the installation hole 310 and then pass through the hemisphere 300, resulting in damaging other components in the first containing space 110, the position limiting portion 220 is provided so that the relative position between the operating body 200 and the hemisphere 300 can be fixed.

In an embodiment, the switch mechanism 600 includes a switch 610, a circuit substrate 620, and a pressing bracket 630.

The switch 610 is made of metal, and the switch 610 has a disc-shaped reversing mechanism.

The circuit substrate 620 is electrically connected to the switch 610.

The pressing bracket 630 is for pressing the switch 610, the pressing bracket 630 is coaxial with the operating body 200, the pressing bracket 630 is roughly cylindrical, and an upper end of the pressing bracket 630 is formed with a hemispherical concave 631 corresponding to the hemisphere portion 212 on the clamping joint 210 provided on the operating body 200, and the lower end of the pressing bracket 630 is formed with a convex portion 632 for pressing the switch 610.

As shown in FIG. 1, FIG. 2, FIG. 8 and FIG. 9, in this embodiment, the switch mechanism 600 includes a switch 610, a circuit substrate 620 and a pressing bracket 630. When the operation body 200 is pressed, the clamping joint 210 approaches the upper end of the pressing bracket 630 until it is abutted against the upper end of the pressing bracket 630, and then continues to press the operating body 200, so that the operating body 200 squeezes the pressing bracket 630, the concave 632 at the lower end of the pressing bracket 630 touches the switch 610 located below the pressing bracket 630, so that the switch 610 is electrically connected, thereby the control unit of the multi-directional input device receives the operation action of the operator on the operating body 200. Specifically in this embodiment, a circuit substrate 620 is provided as a control unit at the bottom of the first containing space 110, and the switch 610 is a movable contact plate, in normal conditions, the movable contact plate is arched in the direction away from the first casing 100, the contact on the movable contact plate is not attached to the contact on the circuit substrate 620, when the second end of the pressing bracket 630 deforms toward the movable contact plate with the pressing of the operating body 200, the movable contact plate is deformed by force, and the arch of the movable contact plate is pressed downward, so that the contacts on the movable contact plate and the contacts on the circuit substrate 620 are electrically connected, and when the external force stops acting on the operating body 200, the operating body 200 resets under the action of the coil spring 530, and at the same time, the movable contact plate recovers its own deformation, and the contacts on the movable contact plate are separated from the contacts on the circuit substrate 620, thereby disconnecting the electrical connection, the control unit can recognize that the person stops manipulating the operating body 200. Since the action of the operating body 200 is a combination of tilting and moving up and down, if the operating body 200 directly touches the switch 610, it is easy to cause the switch 610 to be accidentally touched or in poor contact, by pressing the bracket 630, the switch 610 only recognizes the up and down pressing action of the operating body 200, which is more accurate. In this embodiment, the clamping joint 210 is abutted against the pressing bracket 630 by cooperating the hemisphere portion 212 with the hemispherical concave 631. The operating body 200 works in a combination movement of tilting, upward and downward, thus when the clamping joint 210 is abutted against an upper end of the pressing bracket 630, the clamping joint 210 not only drives the pressing bracket 630 to move downward, at the same time the clamping joint 210 rotates to change the abutting position of the clamping joint 210 and the pressing bracket 630. The hemisphere portion 212 and the hemispherical concave 631 can make the movement of the clamping joint 210 smoother when abutting against the pressing bracket 630 and rotating relative to the pressing bracket 630, thereby the manual manipulation feeling of the operating body 200 is better. Specifically in this embodiment, the hemispherical concave 631 is provided on the upper end of the pressing bracket 630, and the hemisphere portion 212 is integrally formed with the operating body 200. The specific shape of the convex portion 632 can be adjusted and designed as needed, as long as it meets the functional requirements, and is not limited herein.

In an embodiment, the hemisphere 300 is provided with a circular plane portion 301, and the reset mechanism 500 includes a spring bracket 510, a platen 520 and a coil spring 530.

The spring bracket 510 is fixed inside the first containing space 110, and the spring bracket 510 is sleeved on an outer periphery of the pressing bracket 630 at intervals.

The platen 520 is provided between the hemisphere 300 and the spring bracket 510.

An end of the coil spring 530 is abutted against the spring bracket 510, and another end of the coil spring 530 is abutted against the platen 520, so that the platen 520 is abutted against the circular planar portion 301.

As shown in FIG. 1, FIG. 2, FIG. 10 and FIG. 11, in this embodiment, the reset mechanism 500 includes a spring bracket 510, a platen 520 and a coil spring 530. The spring bracket 510 is fixed to the first casing 100, and the spring bracket 510 is provided with a second avoidance opening corresponding to the pressing bracket 630. The lower end of the pressing bracket 630 is sleeved in the spring bracket 510, and the upper end of the pressing bracket 630 passes through the second avoidance opening, which is for being abutted against the clamping joint 210 of the operating body 200. The platen 520 and the coil spring 530 are cooperated to make the operating body 200 return to a vertical state from the tilting state without external force, and at the same time improve the feedback feeling obtained by the hand when the operating body 200 is tilted. The platen 520 is movably provided between the operating body 200 and the spring bracket 510, the spring bracket 510 and the platen 520 are connected through the coil spring 530, and the coil spring 530 presses the platen 520 so that the platen 520 is abutted against the circular plane portion 301 of the hemisphere 300. The coil spring 530 may be a common compression spring or a tower-shaped compression spring. Specifically in this embodiment, the coil spring 530 is a tower-shaped compression spring, one end of the tower-shaped compression spring with a larger spring diameter is abutted against the platen 520, and the end of the tower-shaped compression spring with a smaller spring diameter is abutted against the spring bracket 510, the tower-shaped compression spring can provide more lateral stability while reducing the bending tendency, so that the operation body 200 in the tilting state is easier to be converted back to the vertical state. Specifically in this embodiment, the first containing space 110 includes a first sub-cavity and a second sub-cavity, the hemisphere 300 is provided in the first sub-cavity, the spring bracket 510, the coil spring 530, the pressing bracket 630 and the switch 610 are provided in the second sub-cavity, and when the operating body 200 is pressed, part of clamping joint 210 structure and part of the hemisphere 300 structure will also enter the second sub-cavity. The first sub-cavity is hemispherical, corresponding to the shape of the hemisphere 300, the second sub-cavity is cylindrical, the inner diameter of the first sub-cavity is smaller than the inner diameter of the second sub-cavity, and the coil spring 530 makes the platen 520 be abutted against a connection position of the first sub-cavity and the second sub-cavity.

In an embodiment, the multi-directional input device further includes a second casing 900 provided on an upper portion of the first casing 100. The second casing 900 forms a second containing space 910, both the first rocker arm 710 and the second rocker arm 720 are movably accommodated in the second containing space 910, the second casing 900 is provided with a second opening 920 for the operating body 200 to pass through, and the second opening 920 is provided at a center of the top surface of the second containing space 910.

Figure 12:
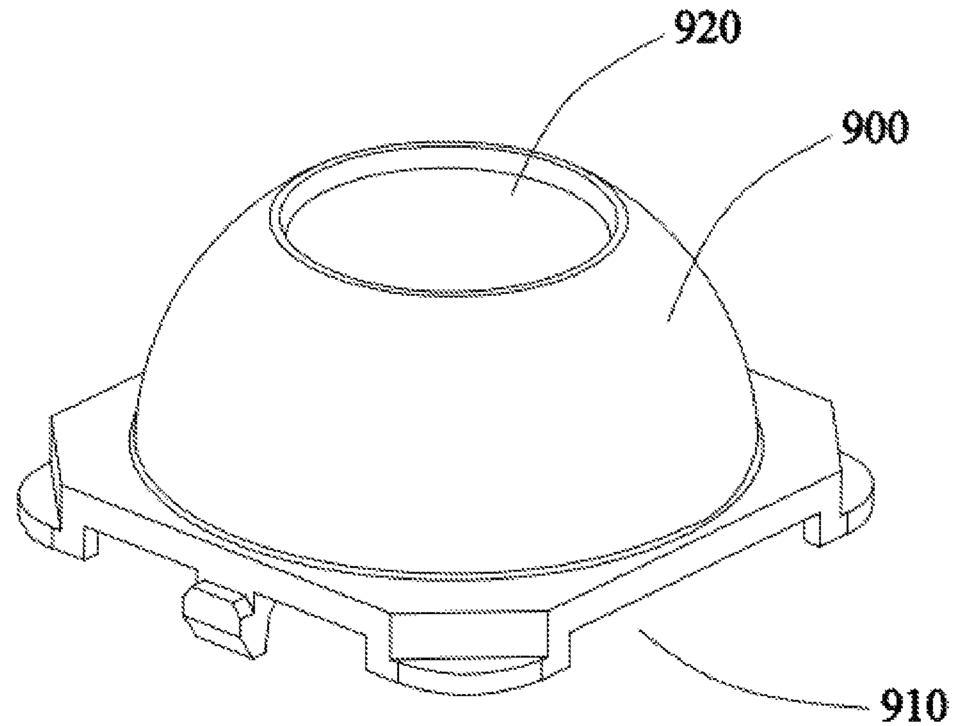
FIG. 12 is a schematic structural view of a second casing of the multi-directional input device of the present disclosure.
Figure 13:
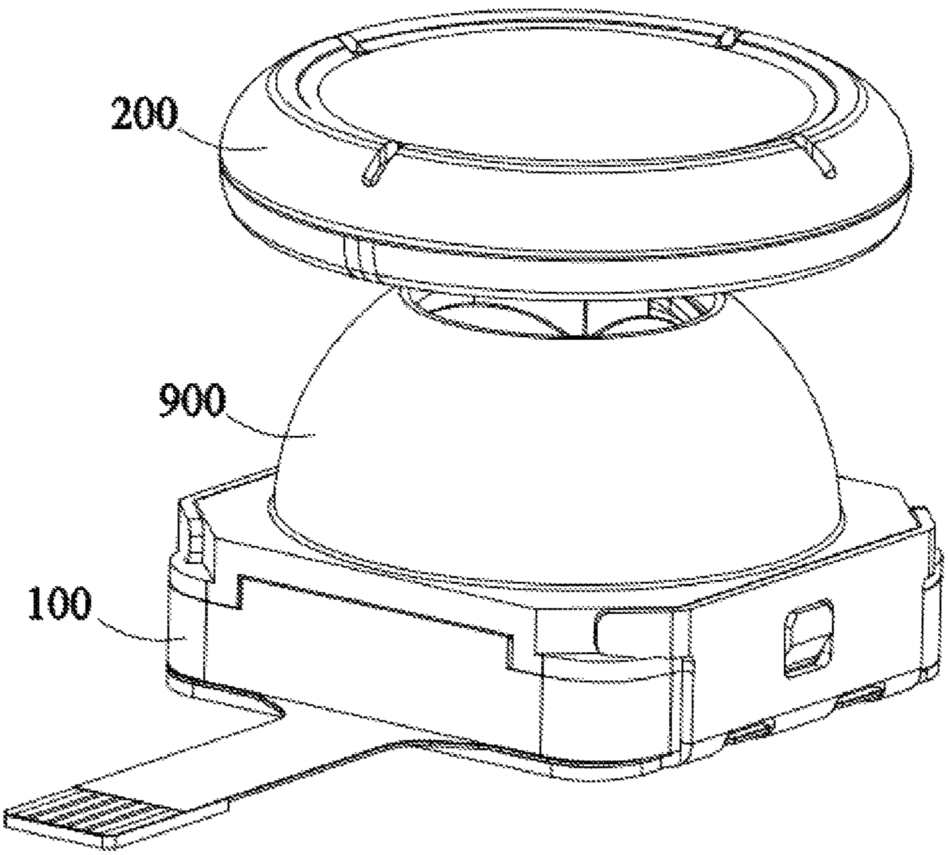
FIG. 13 is a schematic structural view of the multi-directional input device according to an embodiment of the present disclosure.

As shown in FIG. 12 to FIG. 13, the multi-directional input device in this embodiment further includes a second casing 900, the second casing 900 is fixed on the outside of the first casing 100 by screwing or clipping, and forms a second storage space 910 together with the first casing 100, and the first rocker arm 710 and the second rocker arm 720 are movably provided inside the second storage space 910, which protects the first rocker arm 710 and the second rocker arm 720.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A multi-directional input device, comprising:

a first casing provided with a first containing space with a first opening;

an operating body, wherein one end of the operating body is provided with a tiltable operating portion penetrating through the first opening, and another end of the operating body extends into the first containing space and is provided with a clamping joint;

a hemisphere provided with an installation hole for inserting the clamping joint;

a positioning piece provided on an inner wall of the installation hole, wherein the positioning piece is elastically abutted against the clamping joint so that the clamping joint is fixed in the installation hole;

a reset mechanism for returning the operating body to a neutral position;

a switch mechanism for pressing and operating the switch mechanism through the operating body to realize electrical action;

a first rocker arm and a second rocker arm, wherein the first rocker arm and the second rocker arm are provided outside the first casing, the first rocker arm and the second rocker arm rotate following a tilting operation of the operation body, and rotation axes of the first rocker arm and the second rocker arm are horizontal and perpendicular to each other; and a first detection mechanism for detecting rotation movement of the first rocker arm and a second detection mechanism for detecting rotation movement of the second rocker arm;

wherein the multi-directional input device comprises a plurality of positioning pieces provided on an inner periphery of the installation hole;

wherein each of the plurality of positioning pieces is an elastic arm, a first end of the elastic arm is integrally formed with the inner wall of the installation hole, and a second end of the elastic arm extends along an insertion direction of the clamping joint and forms a gap with the inner wall of the installation hole, when the clamping joint is inserted into the installation hole, the clamping joint is abutted against the elastic arm to make the elastic arm deform in a direction to reduce the gap;

wherein the clamping joint is provided with a positioning notch corresponding to the elastic arm, and the elastic arm is inserted into the positioning notch to fix the operating body and the hemisphere; and/or the operating body is provided with a limiting portion towards an insertion direction, and when the clamping joint is inserted into the installation hole, the limiting portion is abutted against and cooperated with an upper surface of the hemisphere to limit the operating body from continuing to be inserted into the installation hole.

2. The multi-directional input device of claim 1, wherein the switch mechanism comprises:

a switch made of metal, wherein the switch is provided with a disc-shaped reversing mechanism;

a circuit substrate electrically connected to the switch; and a pressing bracket for pressing the switch, wherein the pressing bracket is coaxial with the operating body, the pressing bracket is roughly cylindrical, an upper end of the pressing bracket is formed with a hemispherical concave corresponding to the hemisphere on the clamping joint provided on the operating body, and a lower end of the pressing bracket is formed with a convex portion for pressing the switch.

3. The multi-directional input device of claim 2, wherein the hemisphere is provided with a circular plane portion, and the reset mechanism comprises:

a spring bracket fixed inside the first containing space, the spring bracket being sleeved on an outer periphery of the pressing bracket at intervals;

a platen provided between the hemisphere and the spring bracket; and a coil spring, wherein an end of the coil spring is abutted against the spring bracket, and another end of the coil spring is abutted against the platen, so that the platen is abutted against the circular planar portion.

4. The multi-directional input device of claim 1, further comprising:

a second casing provided on an upper portion of the first casing, wherein the second casing forms a second containing space, both the first rocker arm and the second rocker arm are movably accommodated in the second containing space, the second casing is provided with a second opening for the operating body to pass through, and the second opening is provided at a center of a top surface of the second containing space.

* * * * *